United States Patent
Allsup et al.

(10) Patent No.: US 7,818,188 B1
(45) Date of Patent: *Oct. 19, 2010

(54) LONG TERM DISABILITY OVERPAYMENT RECOVERY SERVICE WITH INTERACTIVE CLIENT COMPONENT

(75) Inventors: James F. Allsup, 300 Allsup Pl., Belleville, IL (US) 62223; Scott P. Poston, Millstadt, IL (US)

(73) Assignee: James F. Allsup, Belleville, IL (US)

( * ) Notice: Subject to any disclaimer, the term of this patent is extended or adjusted under 35 U.S.C. 154(b) by 1727 days.

This patent is subject to a terminal disclaimer.

(21) Appl. No.: 10/785,473

(22) Filed: Feb. 24, 2004

Related U.S. Application Data

(63) Continuation-in-part of application No. 09/629,323, filed on Jul. 31, 2000, now Pat. No. 7,260,548.

(60) Provisional application No. 60/189,551, filed on Mar. 15, 2000.

(51) Int. Cl.
*G06Q 40/00* (2006.01)
(52) U.S. Cl. .............. 705/4; 705/2; 705/35; 705/40
(58) Field of Classification Search .................. None
See application file for complete search history.

(56) References Cited

U.S. PATENT DOCUMENTS

| | | | | |
|---|---|---|---|---|
| 4,491,725 A | * | 1/1985 | Pritchard | 705/2 |
| 4,858,121 A | * | 8/1989 | Barber et al. | 705/2 |
| 5,301,105 A | * | 4/1994 | Cummings, Jr. | 705/2 |
| 5,727,249 A | * | 3/1998 | Pollin | 705/40 |
| 6,208,973 B1 | * | 3/2001 | Boyer et al. | 705/2 |
| 6,411,939 B1 | * | 6/2002 | Parsons | 705/35 |
| 6,625,582 B2 | * | 9/2003 | Richman et al. | 705/35 |
| 2002/0188513 A1 | * | 12/2002 | Gil et al. | 705/22 |

FOREIGN PATENT DOCUMENTS

| | | | |
|---|---|---|---|
| GB | 2370892 A | | 7/2002 |
| GB | 2370892 A | * | 7/2002 |

OTHER PUBLICATIONS

Allsup, "Enter Workers' Compensation Savings", 2000; 6 pages.*
Allsup-corpser.htm, "Web archive printout: http://webarchive.org/web/20000229231516/www.allsupinc.com/services/corpser.htm", 2000, 3 pages.*

(Continued)

*Primary Examiner*—Alexander Kalinowski
*Assistant Examiner*—Gregory Johnson
(74) *Attorney, Agent, or Firm*—Polster Lieder Woodruff & Lucchesi, L.C.

(57) ABSTRACT

A method of recovering overpayment of long-term disability benefits paid to a claimant by a client after the receipt of Social Security disability insurance payment with client interaction. The overpayment recovery service is seamless and provides for preauthorized, automated recovery of overpayments from a claimant's account and increases the percentage collected and reduces collection time over conventional methods. The system allows the client selected computer access to participate in and monitor the progress in the award and recovery of the overpayment.

20 Claims, 11 Drawing Sheets

OTHER PUBLICATIONS

Allsup Express, "Allsup Employee Newsletter Article: Bank Transaction Builds Client Base", Sep. 1999; 2 pages.*

Daryle Glynn Brown, "Computer to weed out public housing cheats", St. Petersburg Times (Florida), Apr. 23, 1988, Saturday, City Edition, pp. 1-2.*

Business Reply Mail Card—*First, the Bad New . . . Now the Good News* Date Unknown.

Business Reply Card—*Who Says Drop Outs* Date Unknown.

*The Third-Party Administrator's First Choice in Cost Containment* Date Unknown; 2 pages.

"Disabled? Can't Work? Can't Wait?" Date Unknown; 2 pages.

"PASS—A Complete Benefit, Financial and Medical Services Program for People with Disabilities"; Date Unknown; 10 pages.

*Don't take our word for it when we tell you we're the nation's best Social Security assistance company* 1992; 4 pages.

*The Social Security Disability Specialists* 1993; 2 pages.

Social Security Disability Consultants, October 29, 1993, pp. 1-5.

*How to Get Your Social Security Disability Benefits Quickly & Easily* 1995-1996; 2 pages.

*Allsup Inc.'s Overpayment Recovery Service* 1995-1996; 2 pages.

*Allsup Inc.'s Prescription for Medicare Recovery* 1995-1996; 2 pages.

Printout from Allsup's website—*Allsup's Employer Services* 1996; 3 pages.

Anonymous, "Injured Workers Were Paid Too Much," Sarasota Herald Tribune, Sarasota, Florida, Mar. 28, 1997.

*Help in Applying for Social Security Disability Benefits Allsup Inc.* 1997; 7 pages.

*Allsup Inc.'s Overpayment Recovery Service* 1997-1998, 2 pages.

*Disability Coordination by Allsup Inc* 1999—only 2 months use; 5 pages.

Runner, Diana, "Changes in unemployment insurance legislation during 1998," Monthly Labor Review, Jan. 1998, v112, n1, p. 59; Dialog accession No. 03897677, file No. 148; 11 pages.

King, Drew, "Know the Disability Management Benchmarks," National Underwriter Life & Health—Financial Services Edition, v. 103, n7, p16, Feb. 15, 1999; 2 pages.

Web archive printout: http://webarchive.org/web/19991128152241/http:allsupinc.com/index.html Web archive prinout: http://webarchive.org/web/20000229231516/www.allsupinc.com/services/corpser.htm.

*Enter a New Dimension of Social Security Savings* 2000, 7 pages.

*Enter Long-Term Disability Savings* 2000; 6 pages.

*Enter Workers' Compensation Savings* 2000; 6 pages.

*Enter Group Health Savings* 2000; 6 pages.

*Social Security Disability Assistance Program* 2000; 6 pages.

Printout from Allsup's website: *Pass™-Post -Award Service & Savings* 2000; 2 pages.

*Seamless Overpayment Recovery Service* 2000, 4 pages.

Printout from Allsup's website: *Social Security-Driven Savings* 2003; 3 pages.

Allsup Employee Newsletter Article: *Bank Transaction Builds Client Base* Sep. 1999, 2 pages.

"Older worker's progression from private disability benefits to social security . . . ", Social Security Bullentin; 2000; 63, 4; p. 27-27.

"Pocket Guide to Federal Help for Individuals with Disabilities", Clearinghouse on the Handicapped, U.S. Dept. of Ed., Sep. 1987, p. 2-34.

* cited by examiner

```
┌─────────────────────────────────────────────────────────────────────────┐
│ □ SMARTWARE FOR WINDOWS (NEW VERSION)                          ▁ □ ✕   │
│┌───────────────────────────────────────────────────────────────────────┐│
││WINDOW 1 ══════════════════════════════════════════════════ {{<─>}}  ▲││
││ORSDATA5.VW             ┌─────────────────────────┐        07/26/2000 ││
││SCREEN 1                │ SSR CASE ORS DATA FILE  │        02:42:20P  ││
││                        └─────────────────────────┘                   ││
││ CLIENT CO  :                                                         ││
││ SITE ID    :                                                         ││
││ EMPLOYER   :                                                         ││
││ SSN        :              DECEASED/NO MAIL:                          ││
││ CLAIMANT   :                                                         ││
││ ADDRESS 1  :                                                         ││
││ ADDRESS 2  :                                                         ││
││ CITY/ST/ZIP:                                                         ││
││ CONSULTANT :                                                         ││
││ ASSISTANT  :                                                         ││
││ LEVEL/STS  :                                                         ││
││ CLAIM NBR. :                                                         ││
││ CLMT ELCTD :                                                         ││
││ AOD        :                                                         ││
││                       PgDn FOR CLIENT DATA                           ││
││◁                                                                   ▷ ││
│├───────────────────────────────────────────────────────────────────────┤│
││MENU: DATA FILE ORDER PRINT TOOLS WINDOW HELP REMEMBER QUIT            ││
││VIEW: ORSDATA5.VW WINDOW 1                              REC: 1 (1)     ││
││LOAD CREATE MODIFY SAVE UNLOAD ACTIVATE DISPLAY-ACTIVE IMPORT EXPORT PASSWORD││
│└───────────────────────────────────────────────────────────────────────┘│
└─────────────────────────────────────────────────────────────────────────┘
```

FIG. 4

```
┌─────────────────────────────────────────────────────────────────────────┐
│ □ SMARTWARE FOR WINDOWS (NEW VERSION)                          ▁ □ ✕   │
│┌───────────────────────────────────────────────────────────────────────┐│
││WINDOW 1 ══════════════════════════════════════════════════ {{<─>}}  ▲││
││ORSDATA5.VW             ┌─────────────────────────┐        07/26/2000 ││
││SCREEN 2                │ SSR CASE ORS DATA FILE  │        02:42:20P  ││
││                        └─────────────────────────┘                   ││
││ INITIAL FORMS TO CLMT :         DID ALLSUP DO INITIAL APP:           ││
││ INITIAL FORMS FU      :         INITIAL APP STATUS       :           ││
││ INITIAL FORMS TO SSA  :         RECON FORMS FU           :           ││
││                                                                      ││
││ ORS STATUS            :                                              ││
││ ORS COMMENT           :                                              ││
││ NQ REASON             :                                    ALTF5 ME  ││
││ CURRENT ORS STAGE     :    ┌──────┐  TYPE:    ASSIGNED 2:            ││
││ ORS FU DATE           :    │      │  TYPE:    LEAD ASSNG:            ││
││ LEAD ORS FU DATE      :    └──────┘                                  ││
││ INITIAL REFERRAL STATUS:  PENDING   DIR PAY OPTION AVAIL: Y          ││
││ SSA FORM 795          :                                              ││
││                                                                      ││
││ CALL TRANSITIONED BY REP:       CLAIMANT INCENTIVE       :           ││
││ ORS GROUP             :      PgDn FOR TALK SHEET                     ││
││◁                                                                   ▷ ││
│├───────────────────────────────────────────────────────────────────────┤│
││MENU: DATA FILE ORDER PRINT TOOLS WINDOW HELP REMEMBER QUIT            ││
││VIEW: ORSDATA5.VW WINDOW 1                              REC: 1 (1)     ││
││LOAD CREATE MODIFY SAVE UNLOAD ACTIVATE DISPLAY-ACTIVE IMPORT EXPORT PASSWORD││
│└───────────────────────────────────────────────────────────────────────┘│
└─────────────────────────────────────────────────────────────────────────┘
```

FIG. 5

```
┌─ SMARTWARE FOR WINDOWS (NEW VERSION) ──────────────────────── ▭□▣ ┐
│ WINDOW 1 ══════════════════════════════════════════ {{<—>}} ▲│
│ ORSDATA5.VW            ┌─────────────────────────┐    07/26/2000 │
│ SCREEN 5               │ SSDR CASE ORS DATA FILE │    02:42:20P  │
│                        └─────────────────────────┘               │
│   A. SSDI RETROACTIVE BENEFITS       :  0.00  ACTUAL PAYMENT TYPE :│
│   C. DEPENDENT RETROACTIVE BENEFITS  :         AMTAUTHBYCLIENT  $0.00│
│   D. EXTRA SSDI MONTHLY PAYMENT      :                           │
│   E. TOTAL FUNDS AVAILABLE TO REPAY  :  0.00                     │
│   F. GRS OVERPAYMENT AMT DUE CLIENT  :                           │
│   G. CLAIMANT INCENTIVE PERCENTAGE   :         %                 │
│   H. CLAIMANT INCENTIVE AMOUNT       :                           │
│   I. NET OVERPAYMENT DUE TO CLIENT   :  0.00                     │
│   J. AMOUNT RECOVERED FROM CLAIMANT  :  0.00                     │
│   K. ORS FEE BASIS                   :                           │
│   L. OVERPAYMENT RECOVERY FEE %      :                           │
│   M. ORS FEE                         :         Q. CLAIMS FEE     │
│   N. PERCENTAGE OF OP RECOVERED (J/I):  0.0                      │
│   O. PERCENTAGE OF OP TO REPAY  (J/E):  0.0                      │
│   P. PERCENTAGE OF OP TO RETRO  (J/1):  0.0   PAGE DOWN FOR MORE DATA│
│ ◁                                                              ▷ │
├──────────────────────────────────────────────────────────────────┤
│ MENU: DATA FILE ORDER PRINT TOOLS WINDOW HELP REMEMBER QUIT      │
│ VIEW: ORSDATA5.VW WINDOW 1                          REC: 1 (1)   │
│ LOAD CREATE MODIFY SAVE UNLOAD ACTIVATE DISPLAY-ACTIVE IMPORT EXPORT PASSWORD│
└──────────────────────────────────────────────────────────────────┘
                              F I G . 8

┌─ SMARTWARE FOR WINDOWS (NEW VERSION) ──────────────────────── ▭□▣ ┐
│ WINDOW 1 ══════════════════════════════════════════ {{<—>}} ▲│
│ ORSDATA5.VW            ┌──────────────────────┐       07/26/2000 │
│ SCREEN 6               │ ORS DATA PARTIAL PAY │       02:42:20P  │
│                        └──────────────────────┘                  │
│                                                                  │
│  ┌─ PAYMENTS ─────────────────────┐                              │
│  │ PAYMENT AMT │ PAYMENT DA │ P │ B │                            │
│  │             │            │   │   │                            │
│  │             │            │   │   │                            │
│  │             │            │   │   │                            │
│  │             │            │   │   │                            │
│  └─────────────────────────────────┘                             │
│                                                                  │
│                           END OF DATA                            │
│ ◁                                                              ▷ │
├──────────────────────────────────────────────────────────────────┤
│ MENU: DATA FILE ORDER PRINT TOOLS WINDOW HELP REMEMBER QUIT      │
│ VIEW: ORSDATA5.VW WINDOW 1                          REC: 1 (1)   │
│ LOAD CREATE MODIFY SAVE UNLOAD ACTIVATE DISPLAY-ACTIVE IMPORT EXPORT PASSWORD│
└──────────────────────────────────────────────────────────────────┘
                              F I G . 9
```

```
┌─────────────────────────────────────────────────────────────┐
│ □ SMARTWARE FOR WINDOWS (NEW VERSION)              ─ □ ×    │
│ WINDOW 1 ═══════════════════════════════════ {{<→}}         │
│                      END OF DATA                            │
│                                                             │
│   FEE RATE    : 1.0                                         │
│   CLNT LORS   : Y                                           │
│   ORS RATE    :                                             │
│   ORS OART.   : Y                                           │
│   RETRO                                                     │
│   SSI RETRO                                                 │
│   DEP RETRO                                                 │
│   LORS OP AMT      $0.00                                    │
│   AMOUNT      24.74                                         │
│   LORS FEE        $0.00                                     │
│   ORS QUARTER                                               │
│   PERCENT OF STLMT                                          │
│   ORS AMT DUE CLIENT      0.00                              │
│                                                             │
│ ◁                                                         ▷ │
│ MENU: DATA FILE ORDER PRINT TOOLS WINDOW HELP REMEMBER QUIT │
│ VIEW: ORSDATA5.VW WINDOW 1                      REC: 1 (1)  │
│ LOAD CREATE MODIFY SAVE UNLOAD ACTIVATE DISPLAY-ACTIVE IMPORT EXPORT PASSWORD │
└─────────────────────────────────────────────────────────────┘
```

FIG. 10

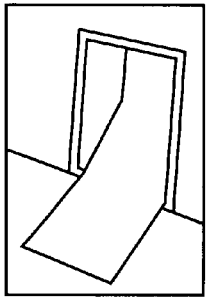

FIG. 11

```
CLIENT REPRESENTATIVE          ENTER SSN
ALLDEMO, INC.                  [        ][SEARCH]   🏠  📄  🚫

SORT BY:  NEED OP CALC | AWARDED | PENDING | CLOSED | ADVANCED
────────────────────────────────────────────────────────────────
WELCOME TO accessALLSUP.com              │ MESSAGE CENTER
○ TO BEGIN, SELECT A SORT OPTION ABOVE   │ PLEASE NOTE THAT REQUIRED
○ CLICK ON THE CLAIMANT'S NAME FOR       │ OFFSET INFORMATION FIELDS
  DETAILED CLAIM STATUS AND OVERPAYMENT  │ HAVE BEEN ADDED TO THE
  RECOVERY INFORMATION.                  │ REFERRAL FORM.
○ CLOSE "POP UP" WINDOW BEFORE VIEWING   │
  THE NEXT CASE                          │
○ CLICK ON "CALC" (WHEN VISIBLE) FOR     │
  SSA QUERY INFORMATION AND TO SUBMIT    │
  AN OVERPAYMENT CALCULATION             │
────────────────────────────────────────────────────────────────
YOUR NAVIGATION, FUNCTION & INDICATOR ICONS ARE:

📄  REFERRAL FORM       ☐  NEW AWARD (VISIBLE FOR 10 DAYS)
    🏠  RETURN HOME         ☒  CLOSE WINDOW
    🚫  LOGOUT              🖨  PRINT PAGE
```

FIG. 12

```
CLIENT REPRESENTATIVE          ENTER SSN
ALLDEMO, INC.                  [        ][SEARCH]   🏠  📄  🚫

SORT BY:  [NEED OP CALC] | AWARDED | PENDING | CLOSED | ADVANCED
────────────────────────────────────────────────────────────────
THIRTYFIVE.CLAIMANT  000-00-0035  LEVEL 1  ORS-NEED PRIMARY OP    CALC
                                           CALC FROM CLIENT

TWENTYONE.CLAIMANT   000-00-0021  LEVEL 1  ORS-NEED PRIMARY OP    CALC
                                           CALC FROM CLIENT

TWENTYSIX.CLAIMANT   000-00-0026  LEVEL 1  ORS-NEED PRIMARY OP    CALC
                                           CALC FROM CLIENT
```

FIG. 13

```
         SSA QUERY SUMMARY | SUBMIT OVERPAYMENT CALC.          [×]

THIRTYIVE, CLAIMANT - 000-00-0035
    COMPANY: ALLDEMO INC.  POLICY: SAMPLEPOLICY#  ID: GROUP A
    ─────────────────────────────────────────────────────────
    ☐ OVERPAYMENT CALCULATION FORM
           PRIMARY OP AMOUNT: $[      ]
    OP CALCULATION PERIOD FROM: [      ]  THROUGH: [      ]
                                              (MM/DD/YYYY-BOTH FIELDS)
    ─────────────────────────────────────────────────────────
         DEPENDENT OP AMOUNT: $[      ]
    OP CALCULATION PERIOD FROM: [      ]  THROUGH: [      ]
                                              (MM/DD/YYYY-BOTH FIELDS)

[SUBMIT INFORMATION] [RESET]
```

FIG. 15

```
 CLIENT REPRESENTATIVE       ENTER SSN
 ALLDEMO, INC.              [        ][SEARCH]  🏠  📄  ⊘

SORT BY:  NEED OP CALC |[AWARDED]| PENDING | CLOSED | ADVANCED
 ────────────────────────────────────────────────────────────
 FORTYFOUR.CLAIMANT     000-00-0044  LEVEL 1  ORS-NEED QUERY FROM SSA
 SIXTYONE.CLAIMANT      000-00-0061  LEVEL 1  ORS-NEED QUERY FROM SSA
 SIXTYSIX.CLAIMANT      000-00-0066  LEVEL 1  ORS-NEED QUERY FROM SSA
 EIGHTYONE.CLAIMANT     000-00-0081  LEVEL 1  ORS-RECOVERED/CLOSED
 FORTYNINE.CLAIMANT     000-00-0049  LEVEL 3  ORS-RECOVERED/CLOSED
 FORTYSIX.CLAIMANT      000-00-0046  LEVEL 3  ORS-RECOVERED/CLOSED
 SEVENTY.CLAIMANT       000-00-0070  LEVEL 1  ORS-AWAITING PAYMENT
                                                 FROM CLAIMANT
 TEN.CLAIMANT           000-00-0010  LEVEL 1  ORS-RECOVERED/CLOSED
 THIRTEEN.CLAIMANT      000-00-0013  LEVEL 3  ORS-RECOVERED/CLOSED
 THIRTYFIVE.CLAIMANT    000-00-0035  LEVEL 1  ORS-NEED PRIMARY OP
                                                 CALC FROM CLIENT   CLAC
 TWENTYONE.CLAIMANT     000-00-0021  LEVEL 1  ORS-NEED PRIMARY OP
                                                 CALC FROM CLIENT   CALC
```

FIG. 16

```
CLIENT REPRESENTATIVE          ENTER SSN
ALLDEMO, INC.                  [        ][SEARCH]   🏠 📄 ⊘

SORT BY:   NEED OP CALC | AWARDED |[PENDING]| CLOSED | ADVANCED
─────────────────────────────────────────────────────────────────
SEVENTYSIX.CLAIMANT   000-00-0076  LEVEL 3  ORS-CLAIMANT ACCEPTED SERVICE
SEVENTYTWO.CLAIMANT   000-00-0072  LEVEL 3  ORS-CLAIMANT ACCEPTED SERVICE
SIXTYSEVEN.CLAIMANT   000-00-0067  LEVEL 3  ORS-CLAIMANT ACCEPTED SERVICE
SIXTYTWO.CLAIMANT     000-00-0062  LEVEL 3  ORS-CLAIMANT ACCEPTED SERVICE
THIRTYEIGHT.CLAIMANT  000-00-0038  LEVEL 1  ORS-CLAIMANT ACCEPTED SERVICE
THIRTYNINE.CLAIMANT   000-00-0039  LEVEL 3  ORS-CLAIMANT ACCEPTED SERVICE
```

FIG. 17

```
CLIENT REPRESENTATIVE          ENTER SSN
ALLDEMO, INC.                  [        ][SEARCH]   🏠 📄 ⊘

SORT BY:   NEED OP CALC | AWARDED | PENDING |[CLOSED]| ADVANCED
─────────────────────────────────────────────────────────────────
EIGHTYTWO.CLAIMANT    000-00-0082  LEVEL 3  RETURNED TO WORK
FIFTYTHREE.CLAIMANT   000-00-0053  LEVEL 0  ATTORNEY OR OTHER REPRESENTATION
FIVE.CLAIMANT         000-00-0005  LEVEL 1  DENIED
FORTY.CLAIMANT        000-00-0040  LEVEL 0  LACKS QUARTERS OF COVERAGE
```

FIG. 18

LONG TERM DISABILITY OVERPAYMENT RECOVERY SERVICE WITH INTERACTIVE CLIENT COMPONENT

CROSS-REFERENCE TO RELATED APPLICATIONS

This application is a continuation-in-part of application Ser. No. 09/629,323, filed Jul. 31, 2000, now U.S. Pat. No. 7,260,548, which claimed priority to provisional patent application Ser. No. 60/189,551, filed Mar. 15, 2000.

BACKGROUND OF THE INVENTION

The invention relates generally to methods of securing disability insurance benefits and, more specifically, to novel methods, generally configured with computer and software technology, of securing Social Security disability insurance benefits, recovering overpayments of disability insurance benefits made to a disabled individual by a client insurance company or self-insured employer, and providing limited computer access to the method by client insurance companies or self-insured employers, so that the client can make referrals, provide or confirm overpayment calculations and otherwise monitor selected steps in the method.

The assignee's core business consists of representing individual claimants before the Social Security Administration (SSA) for purposes of obtaining Social Security disability insurance benefits (SSDI). Traditionally, the applicants' primary customers (clients) are insurance carriers that write long-term disability (LTD) policies and self-insured employers who desire to reduce their long-term disability expense by obtaining SSDI for their policy holders or their individual employees. In connection with the provision of services to his clients, the assignee has developed new business methods to provide such services utilizing sophisticated computer programs, databases and electronic fund retrieval methods.

On average, it takes SSA twelve to eighteen months to process a claim for SSDI. Once SSDI is awarded, generally there is a retroactive benefit representing disability payments that should have been paid by the SSA beginning with the sixth full month an individual is off work due to disability. LTD plans are designed to offset the LTD benefit upon the disabled individual's receipt of SSDI. In other words, once SSDI is obtained for a claimant, the LTD is reduced. However, full LTD benefits are paid until the SSDI is awarded. Generally, the disabled employee signs an agreement to repay any overpayment created by the award of retroactive SSDI. A portion of the retroactive SSDI, therefore, is due to the LTD plan as repayment of this overpayment.

For example, a disabled individual is receiving $1,400 per month in LTD. After 18 months, SSA awards disability benefits of $1,000 per month. SSA issues a retroactive check for 12 months of benefits (SSA does not pay during the 5-month waiting period) or $12,000. Based on the plan design the disabled employee's LTD benefit will be reduced by $900 per month, for a net LTD benefit of $500. Since the disabled individual was paid $1,400, he or she would owe the plan $900×12 months, or $10,800.

Additionally, the disabled individual receives a number of financial advantages upon receipt of SSDI:

Increased Monthly Income

Although the initial SSDI may be offset by other disability or retirement benefits the disabled individual already is receiving, the SSDI cost-of-living increases may not. Thus, the combined benefits may increase each year when SSDI cost-of-living increases are paid.

Increased Retirement and Survivors' Benefits

Social Security disability entitlement "freezes" the Social Security earnings record. Social Security regulations stipulate that any years "wholly or partially within a period of disability" will be excluded from the computation of future benefits. Thus, the amount of eventual Social Security retirement benefits, dependents' benefits, or even a subsequent disability or survivors' benefits, may be higher because these lost years of earnings will not be considered in future computations.

Medicare Coverage

After the individual has received SSDI for twenty-four months, regardless of age, he or she also becomes eligible for Medicare benefits. This includes Part A hospital benefits and Part B medical benefits.

Surviving on lower income with mortgages, car payments and other debts is frightening to disabled individuals. When they receive a large check for retroactive benefits, it is difficult to resist the temptation or necessity to use the money to improve their situation. LTD plans were experiencing difficulty collecting this overpayment. The plans were using a variety of collection scenarios:

1. Hope for a lump sum payment by the disabled individual;
2. Recover the overpayment from future benefits ($10,800÷$500=21.6 months); or
3. Refer the individual to a collection agency.

Scenario 1 generally yields a collection rate of 45% to 65% depending on the dollar value of the overpayment. Overpayments of under $10,000 were paid more readily than amounts over $10,000. Scenario 2 only worked if the individual remained on claim long enough to collect the total amount owed. Too often the individual went off claim due to age or death. Additionally, the LTD plan fiduciary lost the time value of money. Worst case is scenario 3, which yields only $0.50 to $0.60 on the dollar. Scenarios 2 and 3 did not promote a positive relationship with the disabled individual. Hence, the inventors recognized the need for assistance in, and a method for, the enhanced recovery of the overpayment, particularly a process that allows monitoring and limited participation by the client insurance carrier or self-insured employer.

Based upon the foregoing, therefore, it would be advantageous to provide a method of obtaining SSDI and recovering any overpayments of LTD benefits for a client insurance carrier or self-insured employer. Furthermore, it would be advantageous to provide such a method that allows a client insurance carrier or self-ensured employer to expeditiously provide or confirm the necessary overpayment calculation upon the award of SSDI and to otherwise monitor the progress of the overpayment recovery procedures for its policyholders or employees as its progresses.

SUMMARY OF THE INVENTION

The present invention provides a method, generally configured with a computer and software technology, for obtaining Social Security disability insurance benefits (SSDI) from the Social Security Administration (SSA) for disabled individuals, recovering any overpaid amounts for client insurance carriers or self-insured employers and allowing limited access to, and monitoring of, select segments of the method by the client insurance carrier or self-insured employer to monitor and facilitate recovery of the overpaid amounts.

The instant invention provides methods of recovering overpayments of long-term disability benefits made by private insurers or self-insured employers after a disabled individual begins receiving SSDI from the SSA. The system preferably provides for the pre-authorized automatic withdrawal of overpaid benefits. The instant invention provides a method of obtaining SSDI from the SSA and recovery of overpayments of long-term disability benefits that utilizes computer and electronic technology to automate the method.

The instant method also provides limited computer access to the system by client insurance companies or self-insured employers so that these third parties can monitor progress of the award and overpayment recovery process.

In accordance with the invention, briefly stated a method of recovering overpayments of long-term disability (LTD) benefits for a client insurance carrier or self-insured employer, after a disabled individual receives SSDI payments which allows participation in and monitoring of the progress of the overpayment recovery by the client insurance carrier or self-insured employer through limited computer access to selected data and steps included in the system.

The overpayment recovery service is seamless and provides for preauthorized, automatic recovery of overpayments from a claimant's account and reimbursement to the long-term disability provider or self-insured employer. Overpayments result from the fact that the long-term disability insurance provider or self-insured employer has paid long term disability benefits to the claimant when the claimant actually was eligible for SSDI but collected benefits from such private insurer or self-insured employer.

The system provides for filing a claim for SSDI, obtaining preauthorization to make an electronic recovery or electronic sweep of a predetermined amount of the overpaid disability insurance after the SSA makes a direct deposit of the SSDI award to a pre-approved account. Through limited computer access to select steps of the method, the insurance carrier or self-insured employer can monitor progress of the recovery effort and expedite calculation of the overpayment amount to facilitate the electronic recovery of the overpayment.

BRIEF DESCRIPTION OF THE DRAWINGS

FIG. 4 is the overpayment recovery service input screen 1, which contains client company and claimant information;

FIG. 5 is the overpayment recovery service input screen 2, which contains information on the status of the overpayment recovery service;

FIG. 8 is the overpayment recovery service input screen 5, which contains payment information;

FIG. 9 is the overpayment recovery service input screen 6, which contains a table to record partial payments;

FIG. 10 is the overpayment recovery service final amount due client screen;

FIG. 11 is the client access component logon screen;

FIG. 12 is the client access component instruction screen;

FIG. 13 is the client access component overpayment calculation requirement screen;

FIG. 15 is the client access component overpayment calculation submission screen;

FIG. 16 is the client access component award data review screen;

FIG. 17 is the client access component pending information review screen; and

FIG. 18 is the client access component closed information review screen.

DESCRIPTION OF THE PREFERRED EMBODIMENT

Seamless Overpayment Recovery Service (Seamless ORS®)

Figure 1:
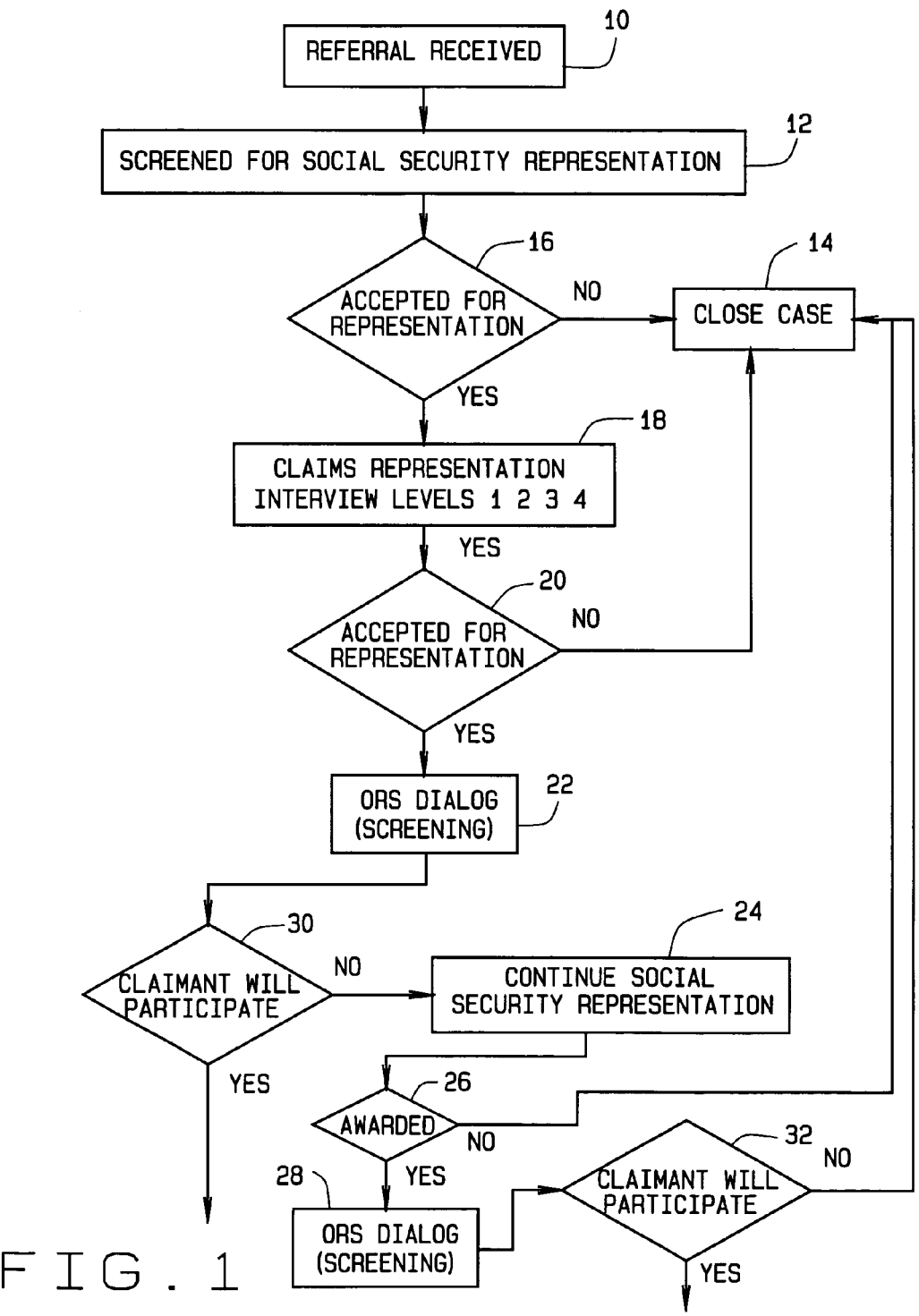
FIG. 1 is a block diagram illustrating the initial steps of the seamless overpayment recovery services method of the present invention.

The instant invention includes specific procedures, computer programs, databases and forms, that, when integrated, meet applicable regulatory provisions and are in compliance with Automated Clearing House Network, Regulation E (regarding electronic funds transfers) and the SSA's rules on the assignment of benefits, to permit immediate withdrawal of an overpaid amount of prior paid long-term disability insurance benefits. The overpaid amount is collected directly from a disabled individual's account after the SSDI payments have been received by the disabled individual from the SSA. The overpaid amount then is returned to the long-term disability insurance carrier or self-insured employer, less applicable fees in appropriate circumstances. By implementing this novel process, the invention increases the success rate of overpaid benefit recovery and decreases the amount of time to effect such recovery.

The method is divided into four major steps, with several important sub-steps. The method of the present invention is best illustrated with reference to the block diagram, FIGS. 1 through 3.

The four major steps of the method include:

1. Initial Social Security Representation, which is designed to secure the award of SSDI from the SSA;

2. Verification Of SSDI Benefit Amount, which is designed to confirm with SSA the SSDI benefit and amount of retroactive payments;

3. Calculation Of The Overpayment Amount, which is designed to expeditiously determine the overpayment of LTD benefits upon receipt of an SSDI award; and 4. Recovery Of The Overpayment, which is designed to recover overpayments through direct withdrawal of funds from the individual's account, preferably by electronic "sweeping" of the overpaid amount from a deposit account.

Initial Social Security Representation

The inventor's Social Security Representation is designed to secure approval of SSDI from the SSA. The steps below, and as illustrated in the drawings, outline the representational process through award of the SSDI claim. For purposes of brevity and clarity, the provider of the novel services will be referred to hereinafter as "The Service Provider"; the client disability insurance carrier or self-insured employer will be referred to as "the client"; and the disabled individual seeking insurance payments is referred to as "the claimant".

Step 1—Identify SSDI-Eligible LTD Claimants

A.—The Service Provider Receives Referrals

As shown in FIG. 1, a LTD claims examiner, generally employed by the client insurance provider or self-insured employer, refers cases to The Service Provider for representation, as indicated by reference numeral 10. The claims examiner submits a completed Social Security Referral Checklist, shown below as Exhibit 1, which provides The Service Provider with an overview of the case and all supporting file documentation. The information from the Referral Checklist then is entered into The Service Provider's computerized databases for processing and screening 12. If the claimant is not accepted for representation, the case is closed 14. If the claimant is accepted for claims representation 16, i.e. is eligible for Social Security disability benefits, the process proceeds to the next major sub-step.

---

Exhibit 1.
SOCIAL SECURITY REFERRAL CHECKLIST

| | | | | |
|---|---|---|---|---|
| Referring Company: | | | Client Co. #: | |
| Street Address: | | | | |
| City/State/Zip: | | | | |
| Phone: | | | Fax: | |
| Disabled Claimant: | | | | Male: ☐ Female: |
| Street Address: | | | | |
| City/State/Zip: | | | | |
| Phone: | | | Date of Birth: | |
| Social Security #: | | | LTD Policy #: | |
| Employer: | | | Occupation: | |
| Diagnosis: | | | | |
| Date Last Worked: | | | Last SSA Denial: | |
| Insurance Contract Offset: | q Primary Only | q SSA Disability Only | | q SSA Widow's Benefits |
| | q Primary & Dependents | q SSA Disability & Retirement | | q Reduced Retirement |
| Diary File: | q 3 Months | q 6 Months | | q 12 Months |
| | | YES NO | | |
| | | | Current LTD Amount: | |
| Is the claimant involved in vocational rehabilitation? | | q    q | | |
| Are there dependents in the household? | | q    q | | |
| Is the claimant receiving widow's benefits? | | q    q | | |
| Is the claim reinsured? | | q    q | If yes, by whom? | |
| Comments: | | | | |

Referred by: _____ Date: _____

---

B.—The Service Provider Determines Claims Level

The Service Provider determines submission of the claim at one of four levels of the SSDI application process, as shown at 18 in FIG. 1. The four levels include an initial application and three sequential levels of appeals, as follows:

1. Initial Application to Disability Determination Service (DDS) of the SSA;
2. DDS Reconsideration of a previous decision;
3. Administrative law judge (ALJ) hearing and ruling on the claim; and
4. Appeals Council review.

If a claim is denied at any of the above listed levels, The Service Provider automatically submits the case to the next level of the process until the case receives a final approval or denial from the SSA, or the referring claims examiner requests that The Service Provider abandon pursuit of the claim.

Step 2—Obtain Claimant's Authorization

A.—The Service Provider Mails Solicitation Packets To Claimants

Once The Service Provider determines that the disabled individual qualifies for SSDI benefits 20, The Service Provider mails a packet of information to claimant explaining the benefits of obtaining SSDI and how it coordinates with LTD in their case through the novel seamless overpayment recovery service of the present invention.

The Service Provider details its services and requests the claimant authorize it to act as his or her representative before SSA. The Service Provider invites the claimant to call its toll-free number if the claimant has any questions. If The Service Provider has not received a response within seven days, it contacts the claimant to discuss its services.

B.—Claimant Submits Authorizations

The claimant signs and returns three authorization forms to The Service Provider in a postage-paid envelope. The first, SSA Form 1696, authorizes The Service Provider to represent the claimant in the SSDI application process. The second, a consent form, gives permission for SSA to release information to The Service Provider concerning work history, entitlement dates, and prior applications. The third form authorizes The Service Provider to release entitlement information obtained from SSA to the client.

Step 3—Applications and Appeals

A.—The Service Provider Interviews Claimant and Completes Forms on Computer Screens The Service Provider representative calls the claimant and secures relevant information to complete the initial application forms for SSDI and the obligation to repay any overpayment resulting from the retroactive award of SSDI.

At this point in the process, the representative completes the ORS Dialog (Screening) 22, FIG. 4, to gather the appropriate information to facilitate the recovery of the overpaid benefit. The claimant is interviewed and the information is entered into The Service Provider's databases through the use of the ORS client company and claimant personal information screen, FIG. 4. This screen contains information on the client company (pre-entered) and the claimant's personal information, (i.e. name, address, Social Security number, etc.). The computer program allows information screen in FIG. 4 also to pull claim status information from the ORS status screen, shown in FIG. 5 which details the status of the SSDI claim (i.e. awarded, closed, denied, pending, and the level of the claim). As seen in FIG. 1, if the claimant declines to participate in ORS, The Service Provider will continue to represent the claimant before the SSA 24 to obtain SSDI. Also as shown in FIG. 1, if the claim is awarded SSDI from the SSA 26, The Service Provider again can screen the claimant for participation in ORS 28. If the claimant again declines participation, the case is closed.

Figure 2:
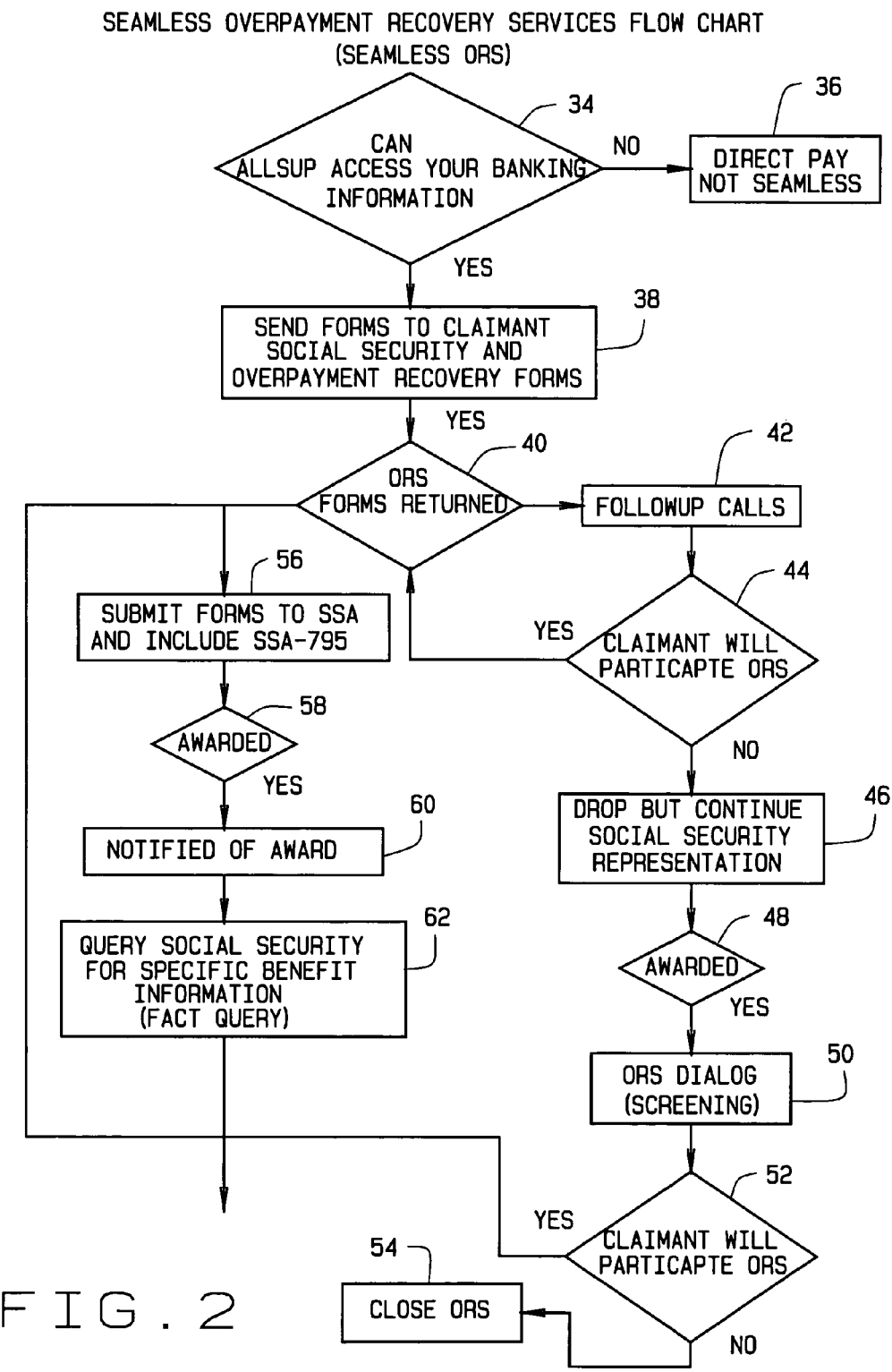
FIG. 2 is a block diagram illustrating additional steps of the novel seamless overpayment recovery services.

If the claimant consents to participation in the Social Security representation with the novel overpayment recovery service 30, either after the initial ORS screening or after the SSDI benefit is awarded 32, The Service Provider obtains written or oral permission, which is immediately reduced to writing or entered into a computer, from the claimant to access the claimant's banking information 34 in FIG. 2. For example, The Service Provider can obtain this authorization to access the claimant's banking information via computer, through a written form, or over the telephone. If the claimant declines, a direct manual payment of the overpaid amount may be made by the claimant to The Service Provider on behalf of the referring insurance company or self-insured employer 36.

If the claimant agrees to allow The Service Provider to access his or her banking information, The Service Provider sends to the claimant for signature the appropriately completed form SSA-795 to authorize the SSA to make a direct electronic payment of the SSDI to the claimant's account 38. The Service Provider also forwards for signature the appropriately completed forms that permit The Service Provider to electronically access the claimant's account to recover the overpaid benefit 38, i.e. a preauthorized withdrawal form.

B.—Claimant Returns Forms

The claimant reviews and signs the initial application and additional forms and returns them in a postage-paid envelope provided by The Service Provider 40. As shown in FIG. 2, if the claimant fails to return the signed authorization forms to The Service Provider, the representative initiates a follow-up 42. If the claimant still chooses to participate in ORS 44, the forms then are returned to The Service Provider 40.

If, at this point in the process, the claimant declines participation in ORS, the ORS service is discontinued but The Service Provider will continue to represent the claimant before the SSA to obtain the SSDI benefit 46. If the benefit is awarded, The Service Provider again will screen the claimant for participation in ORS. If the claimant again declines participation, the case is closed. If, after receiving the award, the claimant chooses to participate in ORS 48 the claimant again is screened for ORS participation 50. If the claimant agrees to participate at this juncture 52, the ORS forms are returned to The Service Provider, as shown at 40 in FIG. 2. If the claimant again declines to participate in the overpayment recovery service, the case is closed 54.

C.—The Service Provider Submits Application

When the claimant agrees to participate in the overpayment recovery service, at either juncture, The Service Provider representative processes the initial application forms for claims with any necessary documentation to the SSA 56. After SSA enters the claim into its system, it will forward the medical information to DDS.

D.—The Service Provider Accumulates Data and Tracks Progress

The Service Provider representative follows-up with SSA and DDS on a regular basis to track the progress of each application or appeal. The tracking of the progress of each application is accomplished through The Service Provider's centralized data processor driven by appropriate software. Examples of a computer generated data input and tracking screens employed in the novel process include the ORS status screen FIG. 5. The screen FIG. 5 contains information on the ORS status (pending, awarded, refunded, denied/not eligible, if not qualified, the reasons, and what stage of ORS the claim is in). The screen provides the identity of the ORS specialist assigned to the case, an ORS follow-up diary date, information from SSA Form 795, and initial referral status.

Figure 7:
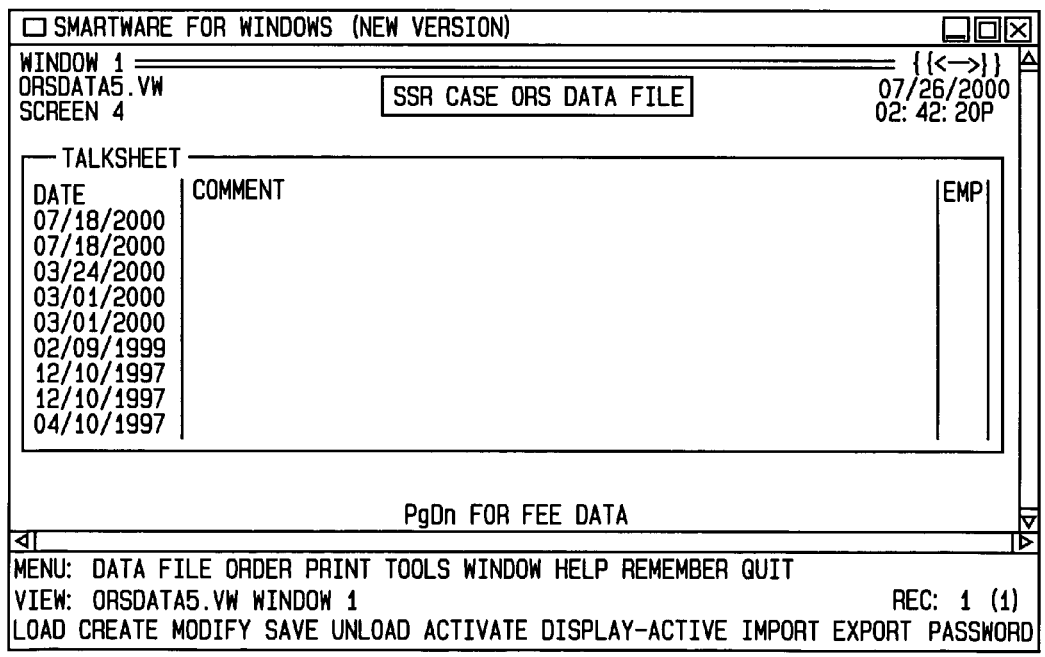
FIG. 7 is the overpayment recovery service input screen 4, which contains log notes.

A log note screen, which includes notes in reverse chronological order, is illustrated in FIG. 7. The Service Provider enters the information provided in the log notes, FIG. 7, generally by a claims specialist or an ORS specialist of The Service Provider.

Figure 6:
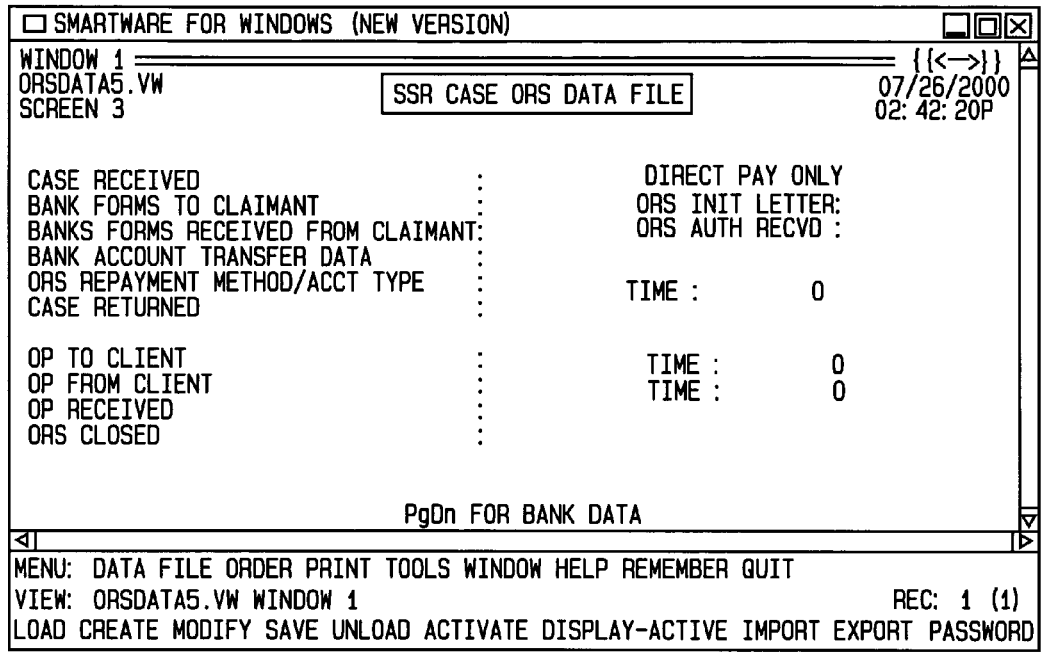
FIG. 6 is the overpayment recovery service input screen 3, which contains overpayment information.

Other aspects of monitoring and tracking are performed by monitoring data entered into the central process through a screen illustrated in FIG. 6. This screen is the overpayment recovery input screen, which includes overpayment information. For example, the data includes the date the ORS case was received. It tracks when the bank forms were sent to the claimant and confirms when the signed bank forms were received back from the claimant and allows The Service Provider to track for follow-up. FIG. 6 also indicates when the transfer was made from the claimant's bank account and also indicates the type of ORS repayment to which the claimant has consented. The screen provides the date the payment was made to the client, when an adjustment in the overpayment was received from the client and the date the ORS file for the particular claimant was closed.

The screen indicated as FIG. 8 is the overpayment recovery system input screen which contains payment information such as the amount of retroactive benefit the claimant is entitled to, dependent benefits, extra SSDI monthly payments, gross overpayment amount due to the client, incentives, net overpayment due to the client, the amount recovered, and The Service Provider's fee.

The screen indicated as FIG. 9 provides a table to record partial SSDI payments, i.e. payment amount, payment dates and whether the payment was made for the claimant or a dependent. The screen indicated as FIG. 10 indicates the overpayment recovery system final amount due to the client.

It will be appreciated that the use of the input screen FIGS. 4-10 allow The Service Provider to accumulate sufficient data to operate the system and allows for complete tracking of the status of any pending claim. The software is configured to create and sustain relational data bases so that the information entered into the computer through any of the above described screens subsequently is moved to appear on another screen, if relevant to that screen. Therefore, each datum needs to be entered only once.

E.—SSA/DDS Approves or Rejects Claim

SSA either approves or denies the claim and notifies The Service Provider representative and the claimant.

F.—The Service Provider Notifies Referring Client and Claimant of Decision

The Service Provider representative notifies the client examiner and claimant of SSA's decision and either initiates Step 4, below—Approval Processing—or continues with the appeals process until final denial or approval is made.

Step 4—Approval Processing

A.—The Service Provider Notifies Client and Claimant of Approval

When the SSA approves a claim and the SSDI is awarded 58, The Service Provider calls, mails or faxes an award notification to the client examiner 60. The Service Provider also can notify the client through the novel interactive client access component of the invention, as described in detail below.

B.—The Service Provider Requests Confirmation

The Service Provider requests specific information known as a Fact Query from SSA regarding the award of SSDI 62. This information includes: The PIA (Primary Insurance Amount); benefit increases and effective dates; retroactive amount; date of SSDI award; the debit run date or "DRD"; and date of onset established by SSA. This information is added to the appropriate computer database through screen FIG. 8.

Appropriate information obtained through the Fact Query is provided through the Fact Query information screen, FIG. 14, for use in the client access aspect of the invention, in one embodiment of the invention, e.g. overpayment calculation FIG. 15, explained in greater detail below.

Verification of SSDI Benefit Amount

The Service Provider's verification of SSDI benefit amount is designed to obtain information regarding the SSDI benefit paid and retroactive amounts. The verification includes two major steps.

Step 1—Claimant Approved for SSDI

A.—Representative Receives Notice

The representative handling the claimant's SSDI claim receives notice from SSA of a favorable decision.

B.—Representative Notifies Client and Claimant

Upon favorable decision 58, a notice is sent to the client and claimant. The notice informs of the award of SSDI and advises that the specific benefit amount will be forthcoming. The notice also reiterates the claimant's responsibility to repay the overpayment of LTD benefits.

Step 2—The Service Provider Verifies SSDI

A—The Service Provider Requests Information from SSA

The Service Provider requests specific information known as a Fact Query from SSA regarding the award of SSDI 62. This information includes: The PIA (Primary Insurance Amount); benefit increases and effective dates; retroactive amount; date of SSDI award; the debit run date or "DRD"; and date of onset established by SSA. This information is added to the appropriate computer database through screen FIG. 8.

B.—The Service Provider Receives Information from SSA

Figure 3:
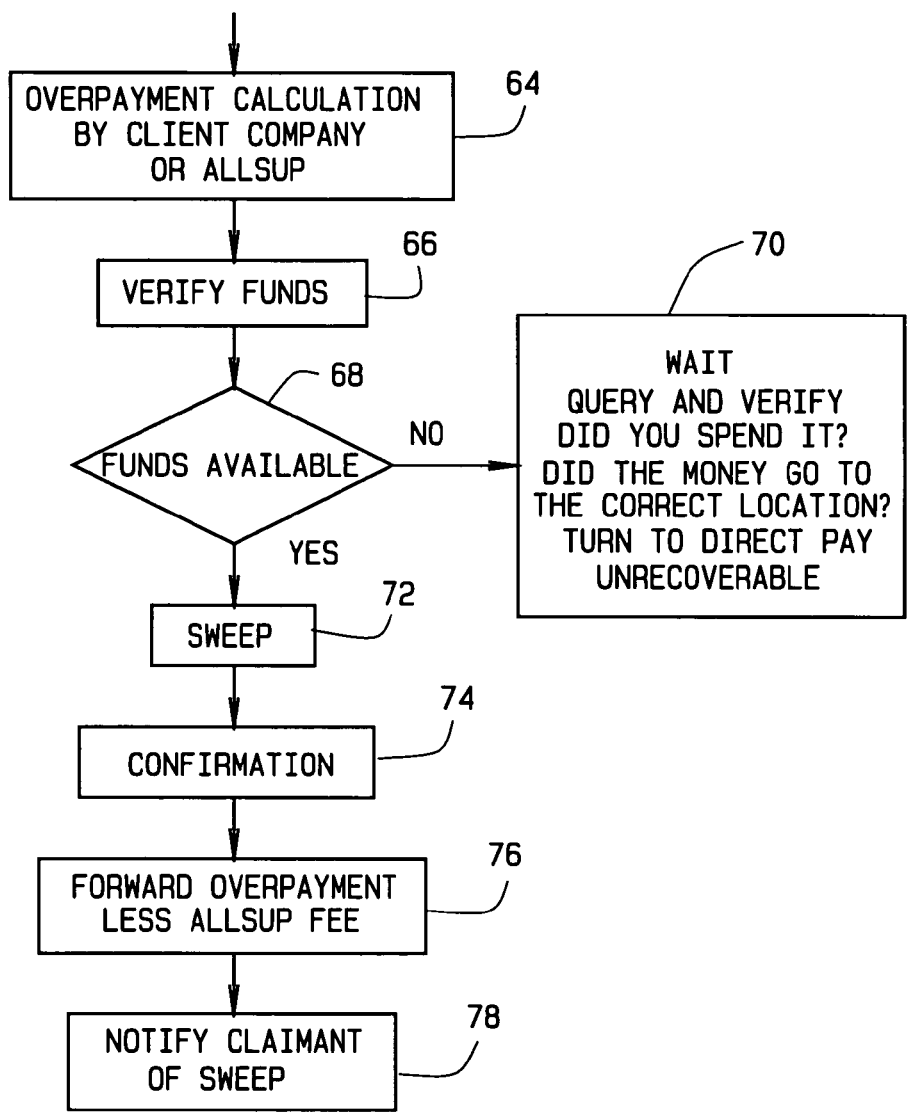
FIG. 3 is another block diagram illustrating additional steps of the novel seamless overpayment recovery services.

Upon receipt of information, The Service Provider determines or obtains the amount of the overpayment, as shown at 64 in FIG. 3.

Calculation of the Overpayment Amount

Calculation of the overpayment amount requires two major steps.

Step 1—Representative Receives SSDI Award Information

The Service Provider representative receives detailed entitlement dates and SSDI benefit amounts from SSA.

Step 2—The Service Provider or Client Calculates the Overpayment

A. The Service Provider immediately calculates the overpayment upon receipt of SSDI award information and enters the data through screen FIG. 8. The client generally verifies the Service Provider Calculated amount. See Example 1, following, for a representative example of an overpayment calculation;

B. The client calculates the overpayment amount and submits that amount to The Service Provider by any acceptable means; or C. Clients subscribing to the interactive component of the present invention calculate the overpayment amount and submit the overpayment amount to The Service Provider through the overpayment calculation and submission screen, illustrated in FIG. 15, as explained in greater detail below.

Example 1
REPRESENTATIVE OVERPAYMENT CALCULATION

SSDI Award Information

It is October 1999. The claimant has been awarded SSDI benefits effective October 1997.
The following information is received from Social Security Administration:

| | |
|---|---|
| Wage Earner Retroactive Benefits payable through Oct. 3, 1999 | $17,462.00 |
| Net Monthly benefit Nov. 3, 1999 and continuing | $741.00 |
| Date of Entitlement to Medicare Part A | Oct. 1, 1999 |
| Date of Entitlement to Medicare Part B | Oct. 1, 1999 |
| Established Date of onset | Apr. 15, 1997 |
| Date of entitlement to cash benefits | Oct. 1, 1997 |
| Scheduled medical reexam date | Oct. 1, 2002 |
| Date payment certified by Social Security | Sep. 28, 1999 |
| Monthly payment beginning Oct. 1, 1996 for Wage Earner | $700.00 |
| Monthly payment beginning Dec. 1, 1996 for Wage Earner | $721.00 |
| Monthly payment beginning Dec. 1, 1997 for Wage Earner | $741.00 |

Overpayment Calculation

| | |
|---|---|
| Monthly LTD Benefit | $1,500.00 |
| Less SSDI Original Rate | − $700.00 |
| New LTD benefit to claimant | $800.00 |

| Date | Original LTD | New LTD | Overpayment |
|---|---|---|---|
| Oct. 1, 1997 | $ 1,500.00 | $ 800.00 | $ 700.00 |
| Nov. 1, 1997 | 1,500.00 | 800.00 | 700.00 |
| Dec. 1, 1997 | 1,500.00 | 800.00 | 700.00 |
| Jan. 1, 1998 | 1,500.00 | 800.00 | 700.00 |
| Feb. 1, 1998 | 1,500.00 | 800.00 | 700.00 |
| Mar. 1, 1998 | 1,500.00 | 800.00 | 700.00 |
| Apr. 1, 1998 | 1,500.00 | 800.00 | 700.00 |
| May 1, 1998 | 1,500.00 | 800.00 | 700.00 |
| Jun. 1, 1998 | 1,500.00 | 800.00 | 700.00 |
| Jul. 1, 1998 | 1,500.00 | 800.00 | 700.00 |
| Aug. 1, 1998 | 1,500.00 | 800.00 | 700.00 |
| Sep. 1, 1998 | 1,500.00 | 800.00 | 700.00 |
| Oct. 1, 1998 | 1,500.00 | 800.00 | 700.00 |
| Nov. 1, 1998 | 1,500.00 | 800.00 | 700.00 |
| Dec. 1, 1998 | 1,500.00 | 800.00 | 700.00 |
| Jan. 1, 1999 | 1,500.00 | 800.00 | 700.00 |
| Feb. 1, 1999 | 1,500.00 | 800.00 | 700.00 |
| Mar. 1, 1999 | 1,500.00 | 800.00 | 700.00 |
| Apr. 1, 1999 | 1,500.00 | 800.00 | 700.00 |
| May 1, 1999 | 1,500.00 | 800.00 | 700.00 |
| Jun. 1, 1999 | 1,500.00 | 800.00 | 700.00 |
| Jul. 1, 1999 | 1,500.00 | 800.00 | 700.00 |
| Aug. 1, 1999 | 1,500.00 | 800.00 | 700.00 |
| Sep. 1, 1999 | 1,500.00 | 800.00 | 700.00 |
| Totals | $36,000.00 | $19,200.00 | $16,800.00 |

The Service Provider Fee Calculation

| | |
|---|---|
| Claims Fee: | |
| Flat Fee | $XXXX.XX |
| Overpayment Recovery Fee: | |
| X % of the Calculated Disability/LTD Overpayment | $XXXX.XX |
| Total Fees Due: | $XXXX.XX |

Amount To Client

| | |
|---|---|
| Amount received from claimant | $16.800.00 |
| Less The Service Provider fees | − $XXXX |
| Net amount to Client Company | $XXXX.XX |

Recovery of the Overpayment

Upon the calculation of the overpayment amount, the method provides the following major steps for recovering the overpayment amount from the disabled individual's account. It will be appreciated that the software is configured to perform the foregoing calculation upon entry of the appropriate data and the calculated overpayment amount will be viewable through an appropriate screen, as described above.

Step 1—Direct Electronic Withdrawal of Funds

A.—Verification of Funds

As shown at 66 in FIG. 3, the representative contacts the claimant's bank or the claimant to verify that there are sufficient funds to cover the pre-authorized withdrawal. As stated above, in a preferred embodiment, the Service Provider already has obtained appropriate documentation to allow it to directly access the claimant's bank account and recover funds through a withdrawal authorization form.

In alternative embodiments of the invention, the claimant may authorize withdrawal of the funds at another juncture in the process, for example, after funds have been deposited. In any event, the claimant authorizes the withdrawal at some point prior to the actual withdrawal by The Service Provider.

If the funds are available 68, The Service Provider can proceed with recovery of the overpaid amounts 68. Generally, The Service Provider anticipates the date of deposit through the Fact Query, Debit Run Date (DRD).

If there are not sufficient funds, The Service Provider can wait for the direct deposit from the SSA 70. Further, The Service Provider can follow up to determine if the funds went to the correct account. Also, The Service Provider can inquire if the claimant had received, but withdrew and spent the money paid by SSA 70. In the event of the latter, The Service Provider can seek a direct payment of the overpaid amount from the claimant or close the case as unrecoverable 70.

B.—Accounting Initiates Withdrawal of Funds

The Service Provider's accounting department initiates the process to withdraw or sweep the funds from the claimant's bank account by virtue of the pre-authorization form 72. If the account has insufficient funds to repay the overpayment, the accounting department will notify the representative.

C.—Representative Contacts Client Company

If the claimant does not have sufficient funds to cover the overpayment, the representative will contact the client company and discuss how it wants to proceed.

D.—Representative Notifies the Claimant

Ten days after the withdrawal, the representative sends the claimant a confirmation letter with full disclosure of the overpayment and the withdrawal amount 74.

Step 2—The Service Provider Issues LTD Overpayment to the Client

A.—The Service Provider Issues Check to Client Company

The Service Provider subtracts its fee for services performed. It issues a check to the client company 76 along with copies of the ORS Statement and confirmation of withdrawal or copy of the check received from the claimant 78; or B.—The Service Provider subtracts its fees for services and electronically transfers overpaid amounts to the client.

Step 3—The Service Provider Furnishes Management Reports

A.—The Service Provider Furnishes Management Reports

The Service Provider furnishes monthly management reports to the client company, which easily can be generated by gathering data represented by the foregoing screens, FIGS. 4-10. The reports are a consolidated listing of all claimants referred for overpayment recovery services and itemize the status of each claimant in the ORS process.

The development of processes and procedures to utilize the pre-authorized withdrawal form and the recovery of overpaid amounts and fees from claimants by electronic funds transfers, is a new concept in a specialized industry. As previously indicated, the invention allows The Service Provider to significantly increase the percentage of claimants from whom the overpayment is recovered and significantly increase the aggregate dollar amount recovered, as well as reduce the amount of time involved to effect such recovery. The process of the present invention imparts other benefits including, but not limited to:

The Service Provider Fees—Social Security Representational Service for Individuals.

Only 32% of the working population is covered by an LTD plan. The Service Provider offers Social Security Representational services for those disabled individuals that are not insured by an LTD plan. Direct payment or escrow accounts were the only methods previously available to obtain its fees. The novel process allows The Service Provider to use a pre-authorization for withdrawal of its fees from the individual's bank account.

Interactive Client Component

Although the overpayment recovery system described works very well for its intended purposes, there has been growing interest on behalf of the client insurance company or self-insured employer to monitor the progress of the recovery of an overpayment. The term monitoring is intended to include having access to and the ability to determine the progress of the overpayment recovery process and/or also participate in the overpayment recovery, such as calculate the overpayment amount, as needed to aid and expedite the process. The monitoring functions are set out below with reference to FIGS. 11 through 18.

The inventors, therefore, have developed an improved system that allows access by the client to make referrals and to monitor selected steps of the overpayment recovery system so that the client can check the status and monitor progress of those selected steps. Although the electronic overpayment recovery method set out above is a preferred embodiment of an overpayment recovery method, it will be understood that the interactive client component now described is intended to be used with any overpayment recovery method, regardless of the steps involved in the overpayment recovery method, itself.

In general, the improvement comprises a computer-based system for notification of the client when an SSDI award has occurred for a named claimant. Once The Service Provider obtains the necessary information on the award information from the SSA Fact Query (as set out above), the Fact Query information is entered into the system for access by the client, for example, through the computer screen illustrated in FIG. 14. The client then accesses the system and computes the amount of the outstanding LTD overpayment. Through the system the client notifies The Service Provider of the amount of the outstanding LTD overpayment. Once The Service Provider receives the overpayment calculation, it verifies if sufficient funds are in the claimant's account and electronically recovers the calculated overpayment amount from the claimant's account, also as set out above. Once the sweep occurs, The Service Provider electronically confirms with the client that the recovery was made. At anytime during the process, the client can access the system to check on the status of the overpayment recovery process for claim file documentation. The process is performed over a secure Internet® connection. The information is encrypted so others cannot read it.

More specifically, and with reference to the drawings, a web-based access to overpayment recovery is allowed through a logon screen, for example, the logon screen illustrated in FIG. 11. In a preferred embodiment, the access component of the present invention requires a computer web site, which, in the illustrated embodiment is referred to as "accessALLSUP.com". Of course any domain name will suffice. In a preferred embodiment, the site is a 128 bit encrypted site designed to secure login and allows client LTD disability insurance carriers or self-insured employers to access information to review information entered into the system and to provide information, on a real time basis, that is needed to facilitate the overpayment recovery.

As shown in FIG. 11, each client or client employee or agent, will have a user name and a password. The system is designed so that a user only can access the system to review or provide information specific to that client's insured so that the client LTD disability insurance carrier or self-insured can access only its insured's information and cannot access information on claimants insured by other clients.

Upon successful login, the user then accesses an instruction screen, as shown in FIG. 12. The instruction screen allows navigation through the system by the appropriately logged in user. The instruction screen FIG. 12 also contains a Message Center that provides new features or any other communication directed to that user. It will be appreciated that the illustrated screen allows a user to make a referral to the overpayment recovery service. This screen primarily, allows the user to access the system to calculate a overpayment amount, determine if an award was made, determine if an overpayment award is pending, or determine if the case is closed. The user can access the appropriate screen under the Sort By: option.

FIG. 13 illustrates the screen that identifies the client's claimants for whom The Service Provider needs an overpayment calculation. The user then can click on a specific claimant and proceed to calculating the overpaid amount to which the client company is entitled upon an award by the SSA. FIG. 14 is a screen that provides the Fact Query information. Once the user clicks on Calc on the identification screen FIG. 13, he or she is presented with the SSA Query Summary. The Service Provider provides the information contained on the SSA Query Summary. The information on this screen, FIG. 14, allows the user to make the Overpayment Calculation. For example, as set out on the example in FIG. 14, the client is informed that the claimant is entitled to a primary retroactive SSDI payment of $6,657.00. Based upon the difference between the LTD payments made to the claimant by the client, the client then can calculate the amount of overpayment that the client is entitled to recover out of the retroactive amount.

Figure 14:
FIG. 14 is the Fact Query summary screen displayed by The Service Provider.

As seen in FIG. 14, the Fact Query Summary provides the data on which the client calculates the retroactive amount. Again, by way of example, the claimant was entitled to a payment of $473.70 per month from SSA from the date of entitlement, 3/01/2002 until 12/01/2002. From 12/01/2002 until 4/30/2003, the claimant was entitled to $480.30 per month, resulting in the Retroactive Amount of $6,657.00. The SSA Benefits Eligible and SSA Benefits Actual are determined by The Service Provider based upon the SSA rules and regulations governing benefits as applied to a given claimant's case.

Based upon the foregoing Retroactive Amount, the client then calculates and submits the overpayment amount, through the overpayment calculation submission screen, FIG. 15. Based upon the amount submitted by the client, The Service Provider can effect the electronic recovery of the calculated and submitted overpaid amount through the overpayment recovery methods described above, or other appropriate recovery means. The amount recovered then can be paid over to the client, subject to The Service Provider's fees. As indicated in FIG. 15, in addition to the primary insured, the client can submit a calculated overpayment amount for any qualifying dependant of the primary insured.

Referring now to FIG. 16, this status screen allows the client to access a list of its claimants to determine the status of the overpayment recovery activity for any or all claimants. For example, the screen of FIG. 16 is configured to allow access to claimant information for those claimants who qualify for, and will receive, an SSDI retroactive payment. The screen illustrates various stages or Levels of activity. For illustrative purposes, several claimants are shown as still requiring the appropriate query information from the SSA so as to allow The Service Provider to populate the Fact Query Summary Screen, FIG. 14 so that the client can calculate the overpayment, as just explained. Other claimant entries include Level 3-ORS-Recovered/closed, which is self-explanatory. Other Level 1 entries indicate that The Service Provider is awaiting the overpayment calculation from the client, which would be electronically submitted through the calculation submission screen, FIG. 15.

The client also can access the pending information screen, FIG. 17, which provides information to the client on claimants who have elected The Service Provider's overpayment recovery service, but there has been no determination by the SSA whether the claimant qualifies for, or will receive, a SSDI retroactive payment. The screen illustrated in FIG. 18 allows the client user to review all closed cases. For example, claimants listed on this screen may have opted out of the overpayment recovery service and selected other representation. The SSA may have denied retroactive payment to the claimant or the claimant may not qualify at this time because the claimant lacked the appropriate quarters of coverage. In any event, screens illustrated in FIGS. 16, 17 and 18 allow the client to monitor the progress of overpayment recovery for all of its claimants that have elected to subscribe to the overpayment recovery service at some point.

By providing the electronic access to the client, the client can view the retroactive award amount and submit the overpayment amount instantly, thereby facilitating recovery of the overpaid amount by allowing The Service Provider to make the electronic overpayment recovery as soon as the SSDI deposit is made in the claimant's account, as described above, again, improving recovery rates and reducing recovery time. Moreover, the client can access the system and instantly track the progress of the overpayment recovery service for any pending claim. This feature provides considerable advantages to the client in terms of planning and budgeting.

It will be appreciated by those skilled in the art that, although the three primary parts of the novel method of the instant invention have been described separately, these subparts can be integrated, as desired by The Service Provider, to provide any combination of desired products for a client or claimant. Furthermore, various modifications and changes can be made in the foregoing detailed description without departing from the scope of the invention. Therefore, the description and accompanying exhibits are intended to be illustrative only and should not be construed in a limiting sense.

The invention claimed is:

1. A method performed by a service provider of recovering at least a portion of a predetermined amount of overpaid benefits made to a disabled individual by a third party, the method comprising:

a). obtaining from the disabled individual preauthorization for direct recovery of the overpaid benefits from a deposit account of the disabled individual, wherein said preauthorization allows for direct recovery of the overpaid benefits when the disabled individual is awarded Social Security disability insurance benefits (SSDI);

b). filing a claim with the Social Security Administration (SSA) for SSDI on behalf of the disabled individual;

c). obtaining SSDI for the disabled individual as a result of the filing of the claim with the SSA;

d). verifying that the disabled individual's deposit account has sufficient funds to cover a withdrawal of at least a portion of the predetermined amount of overpaid benefits after a direct deposit of the SSDI by the SSA into the individual's deposit account;

e). recovering from the deposit account, by a computer, at least a portion of the predetermined amount of overpaid benefits previously provided to the disabled person by the third party;

f). providing the third party with access to an interactive computer program, the interactive computer program comprising information regarding the progress of one or more of the steps a)-e); and g). returning at least a portion of the recovered amount of overpaid benefits to the third party.

2. The method of claim 1 further comprising electronically receiving information regarding the predetermined amount of overpaid benefits from the third party after the third party accesses the interactive computer program.

3. A method performed by a service provider of recovering overpaid disability insurance benefits paid to a claimant by a client of the service provider, the method comprising:

a). obtaining preauthorization from the claimant for electronic recovery of the overpaid disability insurance benefits before the receipt of a Social Security disability insurance benefits (SSDI) payment;

b). assisting the claimant in setting up direct deposit of SSDI into a deposit account of the claimant;

c). receiving a debit run date from the SSA regarding the direct deposit of SSDI into the deposit account of the claimant;

d). verifying that the claimant's deposit account has sufficient funds to cover a withdrawal of a predetermined amount of overpaid disability insurance benefits after a direct deposit of a SSDI payment into the claimant's deposit account;

e). electronically recovering, by computer, from the claimant's deposit account at least a part of the predetermined amount of overpaid disability insurance benefits previously provided to the claimant by the client; wherein the electronic recovery is completed after a SSDI payment is directly deposited in the claimant's deposit account;

f). returning at least a portion of the amount of the recovered overpaid disability insurance benefits to the client; and g). providing the client access to an interactive computer program through a website of the service provider, the interactive computer program configured to allow engagement in one or more activities selected from the group of activities consisting of monitoring the progress of one or more of the steps a)-f), calculating an amount of an overpaid disability insurance benefit, submitting an amount of an overpaid disability insurance benefit, making a referral of a claimant, and viewing a list of the client's claimants.

4. A data processing system employed by a service provider to manage a disability insurance overpayment recovery service for recovery of an overpaid benefit from a claimant, comprising:

a computer processor for processing data; and computer readable media containing computer software configured to perform data processing functions comprising:

a.) monitoring by a third party client of the progress of a claim for Social Security disability insurance benefits (SSDI) filed on behalf of a claimant and receipt of an award of SSDI from the Social Security Administration (SSA) by the claimant;

b.) accessing a database of a service provider by the third party client, said database including data from which an overpaid amount of benefits paid to the claimant by the third party client is calculated and submitted to the service provider by the third party client;

c.) confirming that the claimant has provided preauthorization to recover from a deposit account overpaid benefits paid to the claimant by the third party;

d.) verifying by the service provider that the claimant's deposit account has sufficient funds to cover a withdrawal of the submitted amount of overpaid benefits; and e.) recovering from the claimant's deposit account at least a part of the submitted overpaid amount of benefits paid to the claimant by the third party client after the award of SSDI by SSA and receipt of SSDI payments.

5. A method performed by a service provider of obtaining Social Security disability insurance benefits (SSDI) for a claimant and recovering an overpayment of benefits previously paid to the claimant by a third party, the method comprising:

determining that the claimant qualifies for SSDI from the Social Security Administration (SSA);

filing a claim for the claimant with the SSA to obtain an award of SSDI;

obtaining preauthorization from the claimant to recover from a deposit account overpaid benefits paid to the claimant by the third party;

assisting the claimant in signing up for direct transfer of SSDI from the SSA to the deposit account;

requesting from the SSA a date and an amount of the direct transfer of SSDI from the SSA to the deposit account;

providing the third party access to an interactive computer program configured to permit the third party to submit an amount of overpaid benefits paid to the claimant by the third party through the interactive computer program;

verifying that the deposit account has sufficient funds to cover a withdrawal of at least a part of the amount of overpaid benefits;

automatically recovering from the deposit account, by computer, at least apart of the overpaid amount; and returning at least a portion of the recovered overpaid amount to the third party.

6. A method performed by a service provider of capturing an amount of overpaid benefits paid to a claimant by a third party after an award of Social Security disability insurance benefits (SSDI) to the claimant, the method comprising:

obtaining authorization from the claimant for capture of the overpaid benefits;

providing the third party access to an interactive computer program of the service provider wherein the interactive computer program comprises information for the third party regarding the progress of the capture of the overpaid benefit by the service provider;

receiving electronically an amount of overpaid benefits to be captured;

verifying that a claimant deposit account has sufficient funds to cover a withdrawal of at least a part of the amount of overpaid benefits to be captured after a direct deposit of SSDI into the claimant deposit account;

electronically capturing at least a part of the amount of overpaid benefits by computer from the claimant deposit account; and returning at least a portion of the recovered overpaid benefits to the third party.

7. The method of claim 6 further comprising assisting the claimant in signing up with the Social Security Administration (SSA) for a direct deposit of the SSDI into the claimant's deposit account.

8. The method of claim 6 wherein the step of obtaining authorization from the claimant for capture of the overpaid amount of benefits from the claimant's deposit account occurs before the SSA makes a direct deposit of the SSDI into the claimant's deposit account.

9. The method of claim 6 wherein the step of obtaining authorization from the claimant for capture the overpaid amount of benefits from the claimant's deposit account occurs after the SSA makes a direct deposit of the SSDI into the claimant's deposit account.

10. A data processing system for managing an overpayment recovery service performed by a service provider for recovery of an overpaid benefit from a disabled individual previously paid by a third party, comprising:
   a computer processor for processing data; and
   computer readable media containing computer software configured to perform data processing functions comprising:
     a). determining that the disabled individual qualifies to receive Social Security disability insurance benefits (SSDI) from the Social Security Administration (SSA);
     b). enabling the service provider to file a claim for SSDI with the SSA on behalf of the disabled individual;
     c). confirming that the disabled individual has provided preauthorization to recover from a deposit account overpaid benefits paid to the disabled individual by the third party;
     d). providing a third party access to a database comprising information regarding the progress of the the claim for SSDI and receipt of an award of SSDI from the SSA; and
     e). recovering from the deposit account at least a part of the overpaid benefit; after the award of SSDI by SSA and receipt of the SSDI in the deposit account.

11. The method of claim 6 further comprising the step of deducting a service fee from the recovered overpaid benefits before returning the at least a portion of the recovered overpaid benefits to the third party.

12. The method of claim 6 wherein the step of obtaining from the authorization from the claimant for capture of the overpaid benefits is performed by telephone, by computer or by written form.

13. A method performed by a service provider comprising:
   a). obtaining preauthorization from a disabled individual for recovery of overpaid benefits;
   b). obtaining Social Security disability insurance benefits (SSDI) from the Social Security Administration (SSA) for the disabled individual;
   c). requesting from the SSA a date and an amount of a direct transfer of SSDI benefits from the SSA to a deposit account of the disabled individual;
   d). verifying that the deposit account of the disabled individual has sufficient funds to cover a withdrawal of a predetermined amount of overpaid benefits made to the disabled individual by a third party client of the service provider;
   e). automatically recovering, by a computer, the predetermined amount of overpaid benefits from the disabled individual's deposit account; and
   f). providing the third party client access to an interactive computer program maintained by the service provider, the interactive computer program comprising data regarding one or more of steps a)-e).

14. The method of claim 13 wherein the interactive computer program is configured to accept information from the third party client regarding the predetermined amount of overpaid benefits made to the disabled individual by the third party client.

15. A computerized method of obtaining Social Security disability insurance benefits (SSDI) for a claimant and recovering an amount of overpaid benefits previously paid to the claimant by a third party, comprising:
   determining that the claimant qualifies for SSDI from the Social Security Administration (SSA);
   filing a claim for the claimant with the SSA to obtain an award of SSDI;
   obtaining authorization from the claimant to access a deposit account held by the claimant;
   assisting the claimant in setting up direct payment of SSDI from the SSA into the deposit account;
   providing the third party with access to a computer database through a website wherein the third party can submit an amount of overpaid benefits to be recovered from the claimant's deposit account;
   verifying that the deposit account held by the claimant has sufficient funds to cover a withdrawal of at least a part of the overpaid benefits after direct payment of SSDI into the deposit account;
   recovering by a computer from the claimant's deposit account at least a part of the overpaid benefits;
   deducting a service provider's fee from the recovered overpaid benefits; and
   returning the remainder of the recovered overpaid benefits to the third party.

16. The method of claim 2 comprising a step of notifying the third party if information regarding the amount of overpaid benefits to be recovered is still required in order to recover the amount of overpaid benefits.

17. The method of claim 3 further comprising electronically notifying the client that the recovery was made.

18. The method of claim 1 further comprising deducting a service provider's fee from the at least a portion of the recovered amount of overpaid benefits.

19. The method of claim 1 further comprising assisting the claimant in setting up direct payment of SSDI from the SSA to the deposit account.

20. The method of claim 1 wherein the step of providing the third party with access to an interactive computer program further comprises providing the third party with access to an interactive computer program through a website.

* * * * *